3,121,859
REMOTE METERING SYSTEM
William E. Furniss, Penn Hills, Pa., assignor to Westinghouse Electric Corporation, East Pittsburgh, Pa., a corporation of Pennsylvania
Filed Apr. 29, 1960, Ser. No. 25,666
4 Claims. (Cl. 340—150)

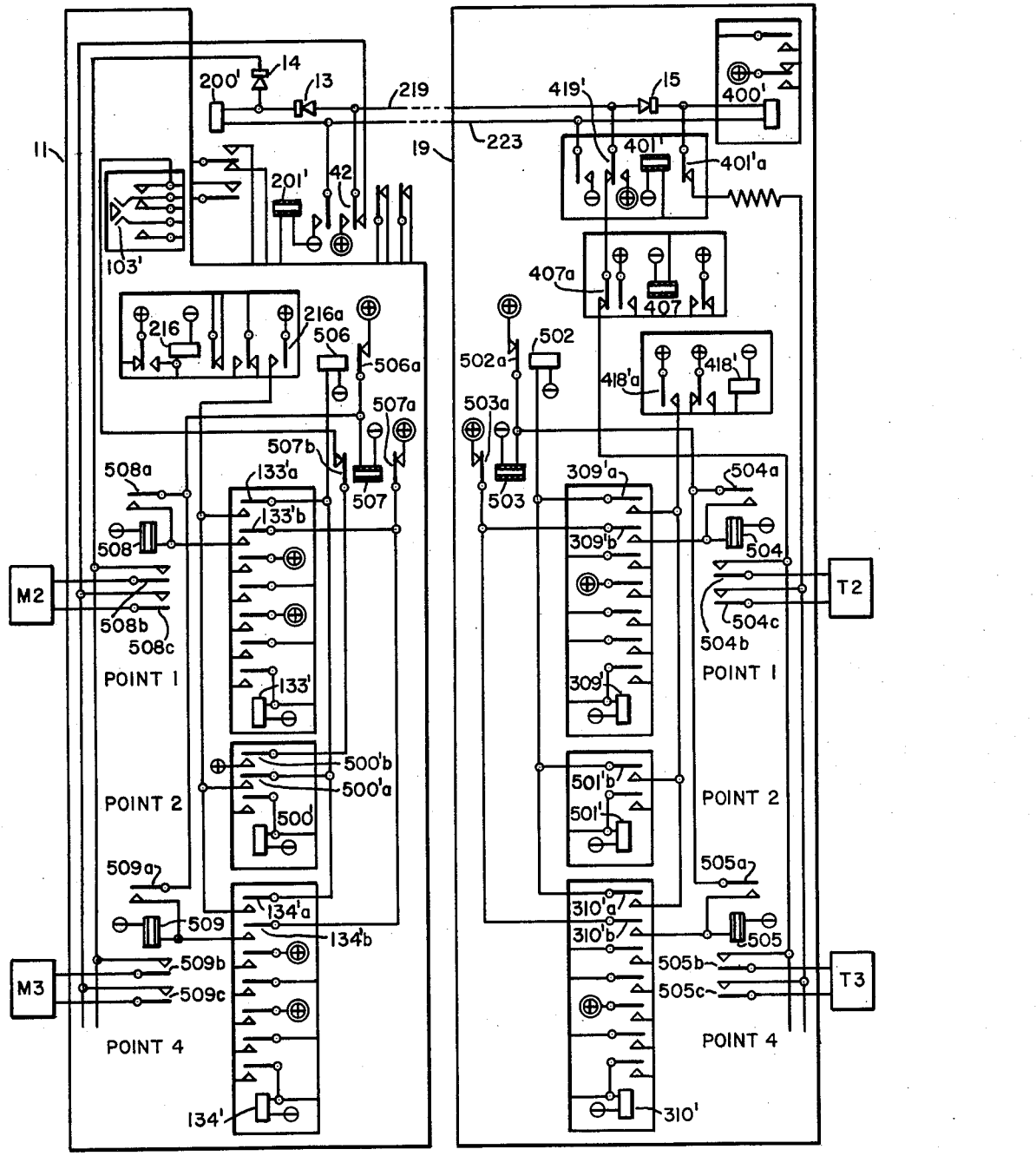

This invention relates generally to remote metering systems, and it has reference, in particular, to selective continuous telemetering systems for use with signal systems, such as remote control systems and the like.

Heretofore, selective continuous telemetering has been provided over the signal channel of selective control apparatus by providing means at the control station and the remote station responsive to completion of point selection signals to discontinue any other metering operation in existence at any other control point at the time of the new metering selection, and providing further means responsive to the completion of the control operation at the selected point to connect the corresponding metering transmitter at the remote station in circuit with the corresponding metering receiver at the control station. This structure requires that the control apparatus be operated through point selection and control operations before the metering circuit is completed, so that an additional control point is required for each metering operation desired. An example, of this type of apparatus is disclosed in the W. A. Derr et al. Patent No. 2,314,692, which issued March 23, 1943.

It is an object of this invention to provide a selective control apparatus for providing selective continuous telemetering circuitry between a control station and a remote station by performing a point selection operation at any one of certain control points to effect operation of the telemetering circuit associated with the selected point without necessitating a control operation on the apparatus connected to be controlled at the selected point.

It is another object of this invention to utilize the point selective operation of control apparatus to disconnect any previously established telemetering point and initiate a telemetering operation at the selected point, and to utilize the control operation of the control apparatus to control other apparatus at its selected point and to retain operation of the newly related metering circuit after completion of the control operation so that where it is desired to relate the metering circuits at a point to the apparatus to be controlled at the same point, the condition of the apparatus may be observed by a point selection operation, only, and whereafter, at the option of the operator, the apparatus at the selected point may be controlled by effecting a control operation of the control apparatus.

It is another object of this invention to utilize the point selection operation of control apparatus to disconnect any previously connected telemetering circuit between the control station and a remote station and to initiate a telemetering operation at the newly selected point and to utilize the control operation of the control apparatus to control certain apparatus at the selected point to control certain apparatus at the selected point in the usual manner and at the same time retain operation of the newly selected telemetering operation after completion of the control operation, so that where it is desired to relate the metering system at a point to the apparatus to be controlled at the point, the condition of the apparatus may be observed by a point selection operation, and whereafter at the option of the operator, the apparatus at the selected point may be controlled by a control operation of the control apparatus in which event the metering circuit will be continued until a new metering point selection operation is made, or, alternatively, the telemetering operation may be discontinued without performing a control operation or after the control operation is performed.

Other objects will in part be obvious, and will in part be explained hereinafter.

In practicing this invention, a telemetering control system at each of a control station and a remote station of a selective control apparatus is operable in response to each point selection operation of the control apparatus to terminate any telemetering operation in existence at any other point, and to connect a telemetering system at the newly selected point to operate over the signal channel of the remote control apparatus. A reset means in each telemetering control system operates in response to a point selection operation of the remote control apparatus to release the seal-in circuit of any operated connector circuit means which is connecting any other telemetering apparatus at any other point to the signal channel. The reset means effects operation of a time delay hold means which allows the released seal-in circuit to drop-out, then operates to complete a pick-up circuit for the connecting means for the telemetering system at the newly selected point as governed by the point selection operation. If the remote control apparatus is thereafter operated to control equipment at the selected point, which equipment may or may not be related to the telemetering at the same point, as desired, the remote control apparatus automatically resets the entire control apparatus, including the selected point relay, thus interrupting the energizing circuit for the telemetering reset means which reverses operation to complete a seal-in circuit for the selected connecting means at the newly selected point to sustain operation of the selected telemetering apparatus at the selected point after reset of the control apparatus.

For a more complete understanding of the nature and scope of my invention, reference may be made to the following detailed description, which may be read in connection with the accompanying drawing, in which the single figure is a diagrammatic view of a remote metering system for use with supervisory control apparatus at control and remote stations.

Referring generally to the drawing, the single figure represents a continuous remote metering system which is applied to a supervisory control system substantially identical with that shown and described in the Derr et al. Patent No. 2,409,840, which issued on October 22, 1946. The system of the Derr et al. patent is a modification of the system of Patent No. 2,091,301, which issued on August 31, 1937 to H. P. Boswau.

For the purpose of simplification, the four figures of the Derr et al. patent have been combined into a single figure with coding, selecting and control apparatus of the control station represented by the enclosure 11, and coding, selecting and control apparatus at the remote station represented by the enclosure 19. Most of the elements of the system of the Derr et al. patent are not shown, but are considered as contained within their respective enclosures.

Certain relays and circuits of the system of the Derr et al. patent have been modified slightly, and new relays have been added in order to perform functions different from those of the apparatus of the Derr et al. patent. Entirely new elements have been designated by reference characters not found in the Derr et al. patent, whereas other elements which are substantially identical with, or are equivalent to, elements of the system of the Derr et al. patent have been designated by means of prime numbers corresponding to the designations in the Derr et al. patent, in order to more readily identify them.

Referring to the single figure of the drawing, it will be seen that the line relays 200' and 400' are connected to the conductors 219 and 223 of the signal channel as shown in the Derr et al. patent to provide communication between the control station 11 and the remote station 19.

In order to provide for effecting selective continuous telemetering over the line conductors 219 and 223, points 1, 2 and 4 of the control apparatus at the control station and corresponding code control relays at the points 1, 2 and 4 at the remote station have been utilized. At the control station, point selecting relays 133', 134' and 500', each shown in an individual opening or window in the enclosure 11, are utilized for equipping points 1, 4 and 2, respectively, for operation with metering apparatus of the telemetering system. It is to be noted that the point selecting relay 500' is not specifically shown in the Derr et al. or Boswau patents but is included therein by implication and general description as relating to point 2 in the same manner as relays 133' and 134' in the Derr et al. patent relate to points 1 and 4, respectively. These relays are connected in the identical manner in which the corresponding relays 133 and 134 are shown connected to the remainder of the system in the Derr et al. and Boswau patents.

At the remote station, code control relays 309', 310' and 501' are shown in an individual opening or window in the enclosure 19 and are utilized for equipping the remote station for operation with the transmitter system of the metering system. The control relay 501' is not specifically shown in the Derr et al. or Boswau patents but is included by direct implication as relating to point 2 in the same way as code control relays 309' and 310' relate to points 1 and 4, respectively.

In order to provide for metering an electrical quantity, such as the voltage, amperage, or wattage of an electrical circuit or any other monitored apparatus having variable characteristics, such as temperature, pressure, rate of flow, level or the like, a telemetering transmitter pair T2 and T3 are provided at points 1 and 4, respectively, at the remote station. The transmitters may be of any suitable type for producing a direct current voltage relating in duration or magnitude to the quantity being measured.

A telemetering reset relay 502 is provided to reset or release from the line channel the lock-in circuit for either of the metering transmitters T2 or T3 which may be in operation when a point selection code is transmitted from the control station. Operation of reset relay 502 is effected through an additional armature 418'a on start preventing relay 418' in cooperation with either the newly added armature 309'a on control relay 309' of point 1 or newly added armature 310'a on control relay 310' of point 4 or contact 501'a on control relay 501' of point 2. Control relay 501' is utilized in this application to terminate operation of any operating metering transmitting means without connecting another transmitter to the channel, as will be hereinafter described in detail. A hold relay 503, of the long time delay release type, is provided for interrupting for a relatively long time the circuits operable to connect the individual transmitters to the signal channel to assure that any operating metering transmitter will be completely disconnected before a new meter is connected to the signal channel. Deenergization of hold relay 503 is provided through armature 502a of reset relay 502. Each metering transmitter T2 and T3 is provided with a corresponding connecting relay 504 and 505, respectively, for operation through an energizing circuit to connect the corresponding transmitter to the signal channel. The energizing circuit for connecting relay 504 extends through armature 503a of hold relay 503 and armature 309'a of control relay 309'. A lock-in circuit for connecting relay 504 extends through its own armature 504a and armature 502a of reset relay 502. The operating circuit for connecting relay 505 extends through armature 503a of hold relay 503 and armature 310'a of control relay 310' of point 4. A lock-in circuit for connecting relay 505 extends through its own armature 505a and 502a of reset relay 502.

A similar telemetering control system is provided at the control station to control operation of metering receiving means corresponding to the previously described metering transmitting means. Specifically, a metering receiving reset relay 506 is provided to reset or release from the line channel any lock-in circuits for either metering receivers M2, M3 which may be in operation when a point selection code is transmitted from the remote station in response to the point selection operation originating at the control station. Operation of reset relay 506 is effected through an additional armature 216'a on point selecting key relay 216' in cooperation with either the newly added armature 133'a on point selecting relay 133' of point 1 or newly added armature 134'a on point selecting relay 134' of point 4 or armature 500'a on point selecting relay 500' of point 2. Point selecting relay 500' is utilized in this application to terminate operation of any operating metering receiver means M2, M3 without connecting another metering receiver to the channel, as will be hereinafter described in detail. A hold relay 507 of the long time delay release type is provided for interrupting for a relatively long time the circuits operable to connect the individual receivers to the signal channel to assure that any operating metering receiver will be completely disconnected before the newly selected meter is connected to the signal channel. Deenergization of hold relay 507 is provided through armature 506a of reset relay 506. Each metering receiver M2, M3 is provided with a corresponding connecting relay 508 and 509, respectively, for operation through an energizing circuit to connect the corresponding transmitter to the signal channel. The energizing circuit for connecting relay 508 extends through armature 507a of hold relay 507 and armature 133'a of control relay 133 of point 1. A lock-in circuit for connecting relay 508 extends through its own armature 508a and armature 506a of reset relay 506. The operating circuit for connecting relay 509 extends through armature 507a of hold relay 507 and armature 134'a of control relay 134' of point 4. A lock-in circuit for connecting relay 509 extends through its own armature 509a and armature 506a of reset relay 506.

At the remote station the connecting relays 504 and 505 are disposed in their energized condition to connect the corresponding metering transmitters T2 and T3 to the signal channel through armature pairs 504a—504b and 505a—505b.

At the control station the connecting relays 508 and 509 are disposed in their energized condition to connect the corresponding metering receivers M2 and M3 to the signal channel through armature pairs 508a—508b and 509a—509b, respectively.

In order to prevent interference between the telemetering transmitters T2 and T3 and the control apparatus, the transmitters may be connected to the line conductors through armature 407a of the remote station receiving relay 407, armature 419 of the remote station driving relay 401', and armature 401'a of the same relay, so as to provide for disconnecting the transmitter from the line conductors whenever a supervisory or control signal is being transmitted. It is to be understood that transmitters T2 and T3 have output signal values below that required for operation of the line relays 200' and 400'.

It will be noted that each transmitter T2 and T3 is normally connected to the line conductors in series circuit relation with the line relays 200', 400' by reason of the rectifier devices 13, 14 and 15. The polarity applied to the line conductors is reversed from that applied thereto during a point selection or control operation of the remote control apparatus, and the series metering circuit is given a high impedance characteristic independently of the parallel line circuit.

At the control station, the metering receiver means M2 and M3 may be connected in series circuit relation with the line conductors, so as to respond to the voltage applied to the conductors from the telemetering transmitters T2 and T3 at the remote station. By connecting the telemetering receivers M2 and M3 to the line conductors 219 through armature 42 of the driving relay 201', any operated receiver will be disconnected from the conductor 219 whenever the armature 42 engages its front contact member for the purpose of applying positive potential to the conductor during a point selection operation or control operation by the control station.

The metering receiving point 2 at the control station and metering transmitting point 2 at the remote station may be utilized as the telemetering reset point if this point 2 is not otherwise in use as a part of the control system. Thus, for purposes of this application, point selection relay 500' at the control station and control relay 501' at the remote station are rendered inoperative to control any apparatus at this point 2. As previously described, these relays at point 2 are utilized only to operate the corresponding reset relays 502 and 506, respectively, to provide telemetering reset in a manner hereinafter described in detail. For this reason, point selecting relay 500' is further modified to include an additional armature 500'b for operating in series with armature 507b of reset relay 507, thereby paralleling the release key 103' for initiating release of the control apparatus in the manner fully described in the Boswau patent.

In normal operation, the telemetering control system is set up for a non-metering condition when the remote control system is at rest. Upon these conditions only the hold relays 503 and 507 at the remote station and control station, respectively, are energized.

Should a point selection operation be intitiated at the control office to select apparatus at point 1 for operation, point operated key relay 216 operates to lock-in and the impulsing relay 201' at the control station will be energized to cause line relay 200' to transmit the appropriate code over the signal channel. The metering receiving circuits will be disconnected from line 219 at armature 42 each time the driving relay is energized. Inasmuch as none of the receiving connecting relays 508, 509 are energized at this time, the meters M2, M3 are not connected with the signal channel and the armature 42 has no effect. At the remote station, line relay 400' operates as each impulse occurs on the line wires 219, 223 and the receiving relay 407 will be energized in response to receipt of the code transmitted from the control station and operates at armature 407a to disconnect from the signal channel any transmitters T2 or T3 which may be connected for operation at the time the new point selection code is transmitted. The start preventing relay 418' operates in sequence with receiving relay 407 and locks-in to set up an energizing circuit at armature 418'a for reset relay 502. At the end of a point selection operation of point 1, control relay 390' operates and locks-in to complete a circuit at armature 309'a to operate reset relay 502. Reset relay 502 operates at armature 502a to open the normally energizing circuit for hold relay 503 and at the same same armature 502a operates to open the lock-in circuit for any of connecting relays 504 or 505 to disconnect from the signal channel any metering transmitter which may be in operation at the time the point selection code is received. Hold relay 503 drops out after a long time delay and operates at armature 503a to complete an energizing circuit for connecting relay 504 through armature 309'b of previously operated control relay 309'. Connecting relay 504 operates and seals in at armature 504a and, at the same time operates at armatures 504b and 504c to connect the transmitter T2 to the signal channel. It is seen that the very slow drop-out characteristic of hold relay 503 prevents energizing of the operating circuits for the connecting relays for a sufficient time to allow reset relay 502 to release the lock-in circuit for any operated connecting relay and allow it to drop-out before the hold relay operates to complete the pick-up circuit for the newly selected connecting relay.

When the control station is sending codes to perform the point selection operation at the remote station, as above described, the remote station responds thereto to send check codes to the control station, which codes initiate the selection of the corresponding point at the control station in the manner fully described in the Derr et al. and Boswau patents. Accordingly, when the point 1 selection code is received at the control station from the remote station, point selecting relay 133' is operated and locks in to complete a circuit at armature 133'a through previously operated armature 216'a of point selection key relay 216' to energize meter reset relay 506. Reset relay 506 operates at armature 506a to open the normally energizing circuit for hold relay 507 and, at the same armature 506a opens the lock-in circuit for connecting relay 508 and 509 to disconnect from the signal channel any metering receiving means which may be connected thereto at the time of receipt of the point selection code from the remote station. Hold relay 507 drops out after a long time delay and operates at armature 507a to complete an energizing circuit for connecting relay 508 through armature 133'b and previously operated point selection relay 133'. Connecting relay 508 operates and seals in an armature 508a and, at the same time operates at armatures 508b and 508c to connect the metering receiver M2 to the signal channel.

From the foregoing description of operation, it is seen that a point selection operation of the control apparatus releases any previously operated connecting means for connecting selected telemetering apparatus at any other point to the signal channel, and at the same time connects the telemetering apparatus at the newly selected point to the signal channel for immediate operation.

If the operator now desires to perform a control operation on any apparatus at the selected point 1, the control key at the control station at point 1, as shown in Derr et al. and Boswau, is operated to operate the driving or impulsing relay 201' at the control station to effect transmission of the appropriate control code to the selected point at the remote station, and the metering receiver M2 will be accordingly disconnected from the conductor 219 at armature 42, each time the driving relay is energized. At the remote station, the receiving relay 407 will be energized in response to the receipt of the code transmitted from the control station, and the transmitter T2 will accordingly be disconnected from the conductor 219 at armature 407a. The control code is applied through previously operated control relay 309' to control any suitable apparatus (not shown) in a manner fully described in the Boswau and Derr et al. patents. At the end of a control operation the remote station and control station automatically go to a reset condition. At the remote station, relays 401', 407', 418', and 309' are released, in the manner described in the Boswau and Derr et al. patents. When relays 418' and 309' are released, they operate at armatures 418'a and 309'a, respectively, to open the energizing circuit for reset relay 502. Relay 502 drops out to operate armature 502a to complete through armature 504a the lock-in circuit for previously operated connecting relay 504. At the same time, the drop-out of reset relay 502 operates through the same armature 502a to energize hold relay 503 which operates at armature 503a to open the pick-up circuit for the connecting relays 504 and 505. Inasmuch as the connecting relays 504 and 505 are of the slow to release type, sufficient time is provided in their drop-out action to remain operated after the control relay 309' drops out and until the seal-in circuit is picked up at armature 502a of reset relay 502. Thus, it is seen that after a control operation is performed at the selected point, the selected telemetering operation is operated continuously thereafter.

At the control station, the automatic reset of the remote control apparatus effects the release of relays 201', 216', and 133'. When relays 216' and 133' are released, they operate at armatures 216'a and 133'a, respectively, to open the energizing circuit for reset relay 506. Relay 506 drops out to operate armature 506a to complete through armature 504a the lock-in circuit for previously operated connecting relay 504. At the same time, the drop-out of reset relay 506 operates through the same armature 506a to energize hold relay 507 which operates at armature 507a to open the pick-up circuits for the connecting relays 508 and 509. The slow drop-out characteristic of the connecting relays 508 and 509 permits the selected connecting relay 508 to remain energized for a sufficient time from deenergization of the pick-up circuit by operation of relay 507 until pick-up of the lock-in circuit by operation of reset relay 506. Thus, at reset of the control station in response to the completion of a control operation, the selected telemetering receiver M2 remains connected to continuously receive signals from the signal channel.

If the operator desires to reset the control apparatus after a point selection operation without sending the control code to operate apparatus at the selected point, he may do so by operating the control apparatus release key as described in Derr et al. and Boswau, thus effecting reset of any point selection relays, such as relay 133' at the control station and any operated control relays such as relay 309' at the remote station. Accordingly, the selected telemetering operation remains on the signal channel in the same manner and through the same operation of the telemetering control relays as described above in the operation of the system to maintain the selected telemetering apparatus on the signal channel after a control operation and automatic reset of the remote control apparatus. At this point, the selected telemetering system may now be removed from the signal channel by operation of the reset point 2, as described below.

If the operator desires to select a different telemetering operation, as at point 4 of the control apparauts, after the control apparatus is reset to normal, as described above, an appropriate code is transmitted between the control station and the remote station to effect operation of the reset relays 507 and 502, respectively, to disconnect meter M2 and transmitter T2, respectively, and to operate corresponding point relay 134' and control relay 310', respectively, to connect meter M3 and transmitter T3 to the signal channel. Thus, the control apparatus is operated to provide selective continuous telemetering.

If the operator desires to discontinue any existing telemetering operation in effect while the control apparatus is in the normal or reset condition without initiating a different telemetering operation, he may do so by merely operating reset point 2 of the control apparatus. Accordingly, the control apparatus operates as generally described above to operate the point selection relay 500' at the control station and corresponding control relay 501 at the remote station. Accordingly, reset relays 502 and 506 operate to deenergize any operated connecting relays to thus terminate any existing telemetering operation. Accordingly, if meter M2 and transmitter T2 are operating at this time they will be disconnected from the signal channel. Inasmuch as no connecting relays are associated with point 2 of the control apparatus, no new telemetering operation is selected. The operation of point selecting relay 500' in conjunction with deenergization of reset relay 507, initiates reset or release of the control apparatus in the manner previously described.

In the foregoing description, only two telemetering points have been described since this is sufficient to illustrate the principles of this invention. However, it is to be understood that the number of telemetering points is limited only by the optional total number of points in the particular remote control system. Each point may have a corresponding telemetering system. Further, it is to be understood that if desired a separate telemetering channel may be provided between the transmitters T2 and T3 and the corresponding meters M2 and M3.

It is apparent that, if desired, the telemetering control system as disclosed herein may be readily adapted for operation in other types of control apparatus as utilizing any known telemetering systems over any known signal channel means.

Since certain changes may be made in the above-described construction, and different embodiments of the invention may be made without departing from the spirit and scope thereof, it is intended that all the matter contained in the above description and shown in the accompanying drawing shall be considered as illustrative only.

I claim as my invention:

1. In a control apparatus having signal channel means extending between a control station and a remote station, a plurality of apparatus points at the remote station and corresponding apparatus points at the control station, means at the control station and the remote station for optionally performing a manually initiated one-step or a two-step selective operation of corresponding pairs of control points over the signal channel wherein the first step comprises selection of a corresponding pair of points for both metering and control operation and wherein the optional second step comprises a control operation of the apparatus at the selected pair of points, in combination, metering transmitting means at the remote station associated with one apparatus point of one pair of said corresponding points, metering receiver means associated with the corresponding apparatus point at the control station, means responsive to a first single manual operation to perform the first step of said selective operation, means responsive to the completion of said first step of the point selection operation at said one pair of corresponding apparatus points for automatically connecting the metering transmitting means and the metering receiver means associated with said one pair of corresponding apparatus points prior to said optional second step in a metering circuit energized by the metering transmitter, means responsive to a second single manual operation for initiating said optional second step, means responsive to the initiation of the optional second step for disconnecting the metering circuit, and means responsive to the completion of the optional second step of an apparatus selection and control operation at said point for reconnecting said metering circuit.

2. In a control apparatus having signal channel means extending between a control station and a remote station, a plurality of apparatus points at the remote station and corresponding apparatus points at the control station, and means at the control station and the remote station for optionally performing a manually initiated one-step or a two-step selective operation of corresponding pairs of control points over the signal channel wherein the first step comprises selection of a corresponding pair of points for both metering and control operation and wherein the optional second step comprises control operation of the apparatus at the selected pair of points, in combination, metering transmitting means at the remote station associated with certain apparatus points, metering receiving means associated with the corresponding apparatus points at the control station, means responsive to a first single manual operation to perform the step of said selective operation, means responsive to the completion of said first step of the point selection of said corresponding apparatus points for automatically connecting the newly selected metering transmitting means and the corresponding newly selected metering receiver means associated with said one pair of corresponding points in a metering circuit prior to said optional second step, means responsive to a second single manual operation for initiating said optional second step, means responsive to the initiation of the optional second step for disconnecting the metering circuit, and means responsive to the completion of the optional second step of an apparatus selection and control operation at said point for reconnecting said newly selected metering circuit.

3. In a control apparatus having signal channel means extending between a control station and a remote station, a plurality of apparatus points at the remote station and corresponding apparatus points at the control station, and means at the control station and the remote station for optionally performing a manually initiated one-step or a two-step selective operation of corresponding pairs of control points over the signal channel wherein the first step comprises selection of a corresponding pair of points for both metering and control operation and wherein the optional second step comprises control operation of the apparatus at the selected pair of points, in combination, metering transmitter means at the remote station associated with certain apparatus points, metering receiver means associated with the corresponding apparatus points at the control station, means responsive to a first single manual operation to perform the step of said selective operation, means responsive to the completion of the first step of the point selection operation of any one of said corresponding pairs of certain points to disconnect any previously connected metering transmitter and receiver circuit and to automatically connect the newly selected associated metering transmitter and receiver associated with said one pair of corresponding points in a metering circuit prior to said optional second step and means responsive to the completion of the optional second step of an apparatus selection and control operation at said point for reconnecting said newly selected metering circuit.

4. In a control apparatus having signal channel means extending between a control station and a remote station, a plurality of apparatus points at the remote station and corresponding apparatus points at the control station, and means at the control station and the remote station for optionally performing a manually initiated one-step or a two-step selective operation of corresponding pairs of control points over the signal channel wherein the first step comprises selection of a corresponding pair of points for both metering and control operation and wherein the optional second step comprises a control operation of the apparatus at the selected pair of points, in combination, metering transmitter means at the remote station associated with certain apparatus points, metering receiver means associated with the corresponding apparatus points at the control station, means responsive to a first single manual operation to perform the step of said selective operation, means responsive to the completion of said first step of the point selection operation of any one of said corresponding pairs of certain points to disconnect any previously connected metering transmitter and receiver circuit and to automatically connect the newly selected associated metering transmitter and receiver associated with said one pair of corresponding points in a metering circuit prior to said optional second step, means responsive to a second single manual operation for initiating said optional second step, means responsive to the initiation of the optional second step for disconnecting the metering circuit, and means responsive to the completion of the optional second step of an apparatus selection and control operation associated with the newly selected point for reconnecting the newly selected metering and transmitting circuit.

References Cited in the file of this patent
UNITED STATES PATENTS

| | | |
|---|---|---|
| 2,314,692 | Derr | Mar. 23, 1943 |
| 2,484,208 | Derr | Oct. 11, 1949 |
| 2,922,142 | Lappin | Jan. 19, 1960 |
| 2,940,069 | Schirmer | June 7, 1960 |